(12) United States Patent
Nishino et al.

(10) Patent No.: US 7,965,883 B2
(45) Date of Patent: Jun. 21, 2011

(54) IMAGE INSPECTION METHOD AND IMAGE INSPECTION APPARATUS EMPLOYING THE SAME

(75) Inventors: Hirohisa Nishino, Tokyo (JP);
Masahiko Uno, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 871 days.

(21) Appl. No.: 11/798,477

(22) Filed: May 14, 2007

(65) Prior Publication Data

US 2007/0269099 A1 Nov. 22, 2007

(30) Foreign Application Priority Data

May 16, 2006 (JP) ................... 2006-136507

(51) Int. Cl.
*G06K 9/00* (2006.01)
*G06K 9/40* (2006.01)
*G01T 1/20* (2006.01)
*G03C 5/04* (2006.01)

(52) U.S. Cl. ........ 382/141; 382/145; 382/149; 382/260; 250/370.11; 430/494

(58) Field of Classification Search .................. 382/141, 382/145, 108, 228, 237, 260, 149; 430/204, 430/487, 218, 494, 244, 202, 199; 250/370.09, 250/370.11; 399/130, 297, 310, 314, 159; 349/1, 2, 19, 24, 25
See application file for complete search history.

(56) References Cited

U.S. PATENT DOCUMENTS

| | | | | |
|---|---|---|---|---|
| 4,926,452 A | * | 5/1990 | Baker et al. | 378/22 |
| 5,130,820 A | * | 7/1992 | Hirota | 358/447 |
| 5,166,786 A | * | 11/1992 | Sakai et al. | 358/527 |
| 5,493,594 A | * | 2/1996 | Hamada et al. | 378/34 |
| 5,870,503 A | * | 2/1999 | Kumashiro | 382/252 |
| 6,052,493 A | * | 4/2000 | Shimakawa | 382/300 |

(Continued)

FOREIGN PATENT DOCUMENTS

JP 63-167167980 7/1988

(Continued)

OTHER PUBLICATIONS

Rueland et al., "Optical μ -Crack detection in combination with stability testing for in-line-inspection of wafers and cells" 20th European Photovoltaic Solar Energy Conference, Jun. 6-10, 2005, Barcelona, Spain.

(Continued)

*Primary Examiner* — Sheela C Chawan
(74) *Attorney, Agent, or Firm* — Buchanan Ingersoll & Rooney PC

(57) ABSTRACT

The method comprises a first step (S1 in FIG. 1) of obtaining a transmission image, a second step (S2) of applying a quadratic differential filter to the transmission image, thereby to emphasize a part of large luminance change as a quadratic differential filter image, a third step (S3) of binarizing the quadratic differential filter image with a predetermined threshold value, and then storing the resulting binarized image, a fourth step (S4) of binarizing the transmission image with another predetermined threshold value, and then storing the resulting binarized image, a fifth step (S5) of performing the measurement of binary feature quantities for the binarized image stored at the third step (S3) and the binarized image stored at the fourth step (S4), and a sixth step (S6) of deciding the quality of the object to-be-inspected from the binary feature quantities.

6 Claims, 3 Drawing Sheets

U.S. PATENT DOCUMENTS

| | | | |
|---|---|---|---|
| 6,151,380 A * | 11/2000 | Zweig et al. | 378/58 |
| 6,404,846 B1 * | 6/2002 | Hasegawa et al. | 378/44 |
| 6,834,117 B1 * | 12/2004 | Rao et al. | 382/149 |
| 2002/0199164 A1 | 12/2002 | Sengupta et al. | |
| 2004/0012775 A1 | 1/2004 | Kinney et al. | |

FOREIGN PATENT DOCUMENTS

| | | |
|---|---|---|
| JP | 08-043315 | 2/1996 |
| JP | 08-220008 A | 8/1996 |
| JP | 0822008 | 8/1996 |
| JP | 09-119900 | 5/1997 |
| JP | 2000-065759 A | 3/2000 |
| JP | 2000-270349 | 9/2000 |
| JP | 2003-307494 | 10/2003 |
| JP | 2006-071552 | 3/2006 |
| WO | WO 2005/100961 A2 | 10/2005 |

OTHER PUBLICATIONS

European Search Report in corresponding Application No. 07009409.9-2218, May 17, 2010, 11 pps.

Coulthard, "Image Processing for Automatic Surface Defect Detection", 19890101, Jan. 1, 1989, pp. 192-196.

Gonzalez et al, "Digital Image Processing", Jan. 1, 2002, Prentice Hall, XP-002580307, pp. 119-124.

Forte, "A Simple Method of Segmentation With Subpixel Accuracy", Kingston Polytechnic, UK, Jan. 1, 1989, pp. 403-406.

Hodor et al, "Optical Sensor Designs for the Detection of Cracks in Optical Materials", SPIE vol. 1168 Current Developments in Optical engineering and Commercial Optics, Jan. 1, 1989, pp. 138-146.

Zhuang et al, "Solar Cell Crack Inspection by Image Processing", IEEE International Conference on the Business Electronic Product Reliability and Liability, Oct. 4, 2004, pp. 77-80.

Rueland et al, "Optical μ-Crack Detection in Combination With Stability Testing for In-Line-Inspection of Wafers and Cells", European Photovoltaic Solar Energy Conference and Exhibition, Jun. 6, 2005, pp. 1-4.

Japanese Office Action dated Dec. 21, 2010 in a corresponding patent application and English-language translation, 14 pps.

* cited by examiner

IMAGE INSPECTION METHOD AND IMAGE INSPECTION APPARATUS EMPLOYING THE SAME

BACKGROUND OF THE INVENTION

1. Field of the Invention

This invention relates to an image inspection method which inspects drawbacks such as flaws, the mixing of foreign matter, and cracks in, for example, a wafer or substrate of semiconductor, and an image inspection apparatus which employs the method.

2. Description of the Related Art

An image inspection method in the prior art has been such that illumination light is transmitted through or reflected from an object to-be-inspected by employing illumination with infrared radiation or the like, and that the object to-be-inspected is visually inspected on the basis of a resulting transmission image or reflection image.

An example wherein the object is inspected by transmitting the illumination light therethrough is disclosed in Non-patent Document 1, that is, Optical µ-Crack detection in combination with stability testing for in-line-inspection of wafers and cells, 20th European Photovoltaic Solar Energy Conference, 6-10 Jun. 2005, Barcelona Spain. and an example wherein the object is inspected by reflecting the illumination light therefrom is disclosed in Patent Document 1, that is, Japanese Patent No. 3,220,690

The image inspection method of the above mentioned prior-arts, however, is chiefly based on the visual inspection. Although automatic inspection is declared to be possible, means therefor is not stated, and the practicability thereof is very scanty.

SUMMARY OF THE INVENTION

This invention has been made in order to eliminate the problem as stated above, and it has for its object to provide an image inspection method which can automatically and precisely perform an inspection concerning drawbacks such as flaws, the mixing of foreign matter, and cracks in an object to-be-inspected, and an image inspection apparatus which employs the method.

An image inspection method according to this invention consists in an image inspection method wherein an object to-be-inspected is illuminated by transmission illumination means, and illumination light transmitted through the object to-be-inspected is imaged as a transmission image by imaging means, so as to inspect the object to-be-inspected, comprising a first step of imaging the transmission image; a second step of applying a quadratic differential filter to the transmission image, thereby to convert the transmission image into a quadratic differential filter image; a third step of binarizing the quadratic differential filter image with a predetermined threshold value, thereby to convert the quadratic differential filter image into a first binarized image; a fourth step of binarizing the transmission image with another predetermined threshold value, thereby to convert the transmission image into a second binarized image; a fifth step of performing a binary feature quantity measurement for the first binarized image and the second binarized image, thereby to calculate binary feature quantities; and a sixth step of deciding a quality of the object to-be-inspected from the binary feature quantities.

Besides, an image inspection apparatus according to this invention consists in an image inspection apparatus wherein an object to-be-inspected is illuminated by transmission illumination means, and illumination light transmitted through the object to-be-inspected is imaged as a transmission image by imaging means, so as to inspect the object to-be-inspected, comprising an image memory in which the transmission image is stored; image processing means for applying a quadratic differential filter to the transmission image, thereby to convert the transmission image into a quadratic differential filter image, for binarizing the quadratic differential filter image with a predetermined threshold value, thereby to convert the quadratic differential filter image into a first binarized image, for binarizing the transmission image with another predetermined threshold value, thereby to convert the transmission image into a second binarized image, and for performing a binary feature quantity measurement for the first binarized image and the second binarized image, thereby to calculate binary feature quantities; and decision means for deciding a quality of the object to-be-inspected from the binary feature quantities.

Since the image inspection method according to this invention is configured as stated above, it can stably and precisely inspect the defects of the object to-be-inspected, such as microscopic flaws, foreign matter, and cracks.

Besides, since the image inspection apparatus according to this invention is configured as stated above, it can stably and precisely inspect the defects of the object to-be-inspected, such as microscopic flaws, foreign matter, and cracks.

DESCRIPTION OF THE PREFERRED EMBODIMENTS

Embodiment 1

Figure 1:
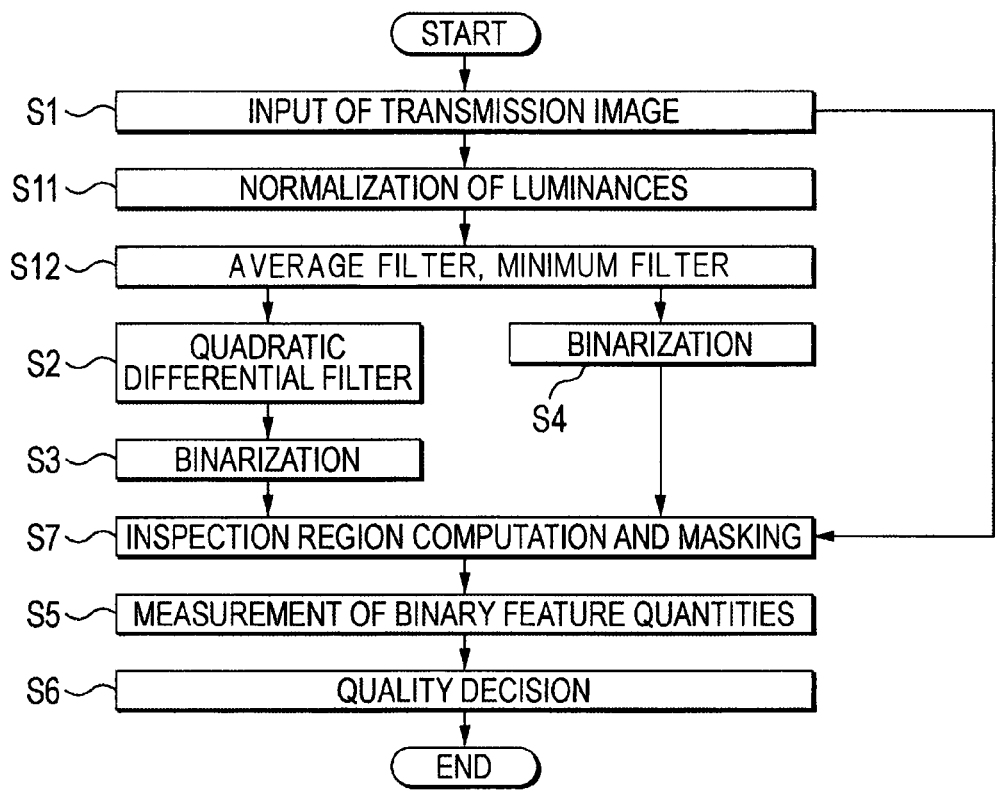
FIG. 1 is a flow chart showing the steps of an image inspection method according to Embodiment 1 of this invention.
Figure 2:
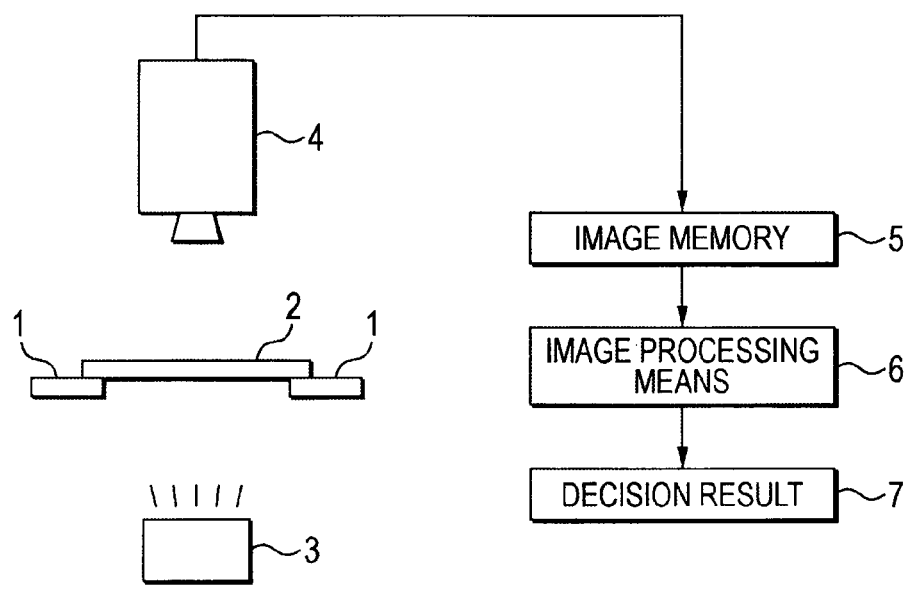
FIG. 2 is a schematic block diagram showing the configuration of an image inspection apparatus which employs the image inspection method according to Embodiment 1.
Figure 3:
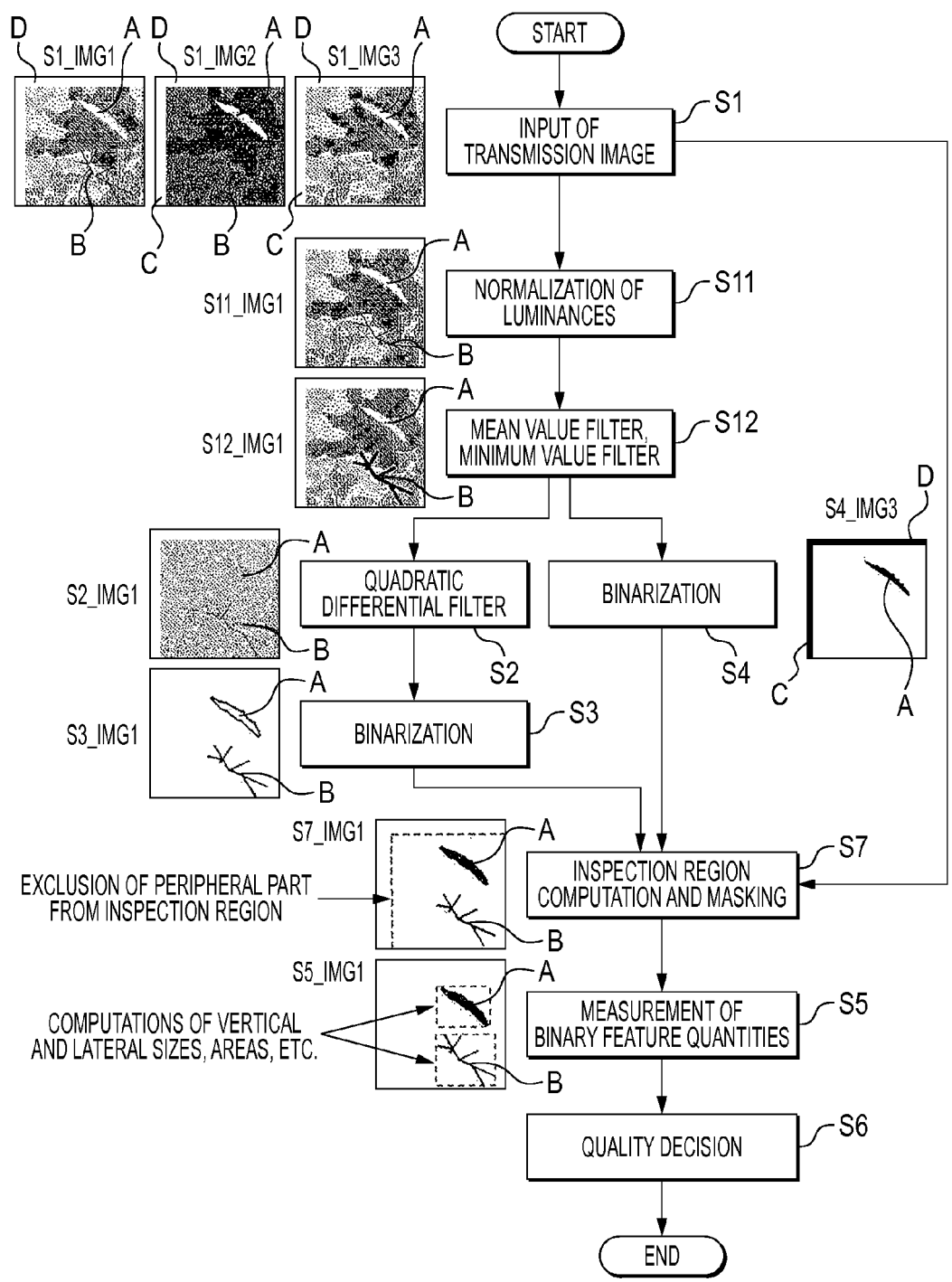
FIG. 3 is a flow chart equivalent to the flow chart of FIG. 1, in which examples of intermediate images under image processing are added.

Now, Embodiment 1 of this invention will be described in conjunction with the drawings. FIG. 1 is a flow chart showing an image inspection method according to Embodiment 1, FIG. 2 is a schematic block diagram showing the configuration of an image inspection apparatus which employs the image inspection method shown in FIG. 1, and FIG. 3 is a flow chart in which intermediate images in the course of the execution of an inspection are added to FIG. 1.

First, the image inspection apparatus shown in FIG. 2 will be described. The image inspection apparatus includes transmission illumination means 3 for illuminating an object to-be-inspected 2 held on a holder 1, from below, and imaging means 4 disposed over the object to-be-inspected 2, and for imaging an image which is generated in such a way that illumination light emitted from the transmission illumination means 3 is transmitted through the object to-be-inspected 2.

The image imaged by the imaging means 4 is stored in an image memory 5, and the image of the object to-be-inspected 2 having been stored in the image memory 5 is subjected to image processing by image processing means 6, until a decision result 7 is outputted. The decision result 7 is outputted by decision means, not shown, for deciding the quality of the object to-be-inspected 2. Incidentally, the quality decision may well be rendered by the image processing means 6. The image processing means 6 executes that image inspection method of this invention whose flow chart is shown in FIG. 1, and the details thereof will be described later.

Examples of the object to-be-inspected 2 are objects such as a wafer of semiconductor (silicon), and a substrate formed with a circuit pattern. In the case of inspecting the semiconductor, illumination which emits infrared radiation adapted to be transmitted through the silicon is often employed for the transmission illumination means 3. Concretely, the illumination corresponds to halogen illumination or the like. The infrared radiation exhibits a rectilinear propagation property higher than that of a light source of another wavelength, and is therefore suitable for the transmission illumination means 3 of this invention. Of course, in a case where the object to-be-inspected 2 is a glass substrate or the like, illumination with visible radiation other than the infrared radiation, for example, with a monochromatic light emitting diode (LED) of red or green may well be employed.

Regarding the selection of the transmission illumination means 3, it is important that the illumination has the wavelength of light adapted to be transmitted through the object to-be-inspected 2, and that a defect is represented on the transmission image even if slightly. Besides, in the case where the illumination emitting the infrared radiation is employed for the transmission illumination means 3, a CCD camera which is combined with a lens provided with an infrared transmission filter is sometimes employed as the imaging means 4. In a case where the imaging means 4 is configured in this manner, other visible radiation components are removed for the CCD camera, and the image of only the infrared light is imaged, so that the configuration is suitable in the case of inspecting the transmission image of the infrared radiation. Of course, it is as stated before that the visible light is sometimes employed depending upon the sorts of the object to-be-inspected 2.

Incidentally, a line sensor camera, a CMOS camera, a vidicon camera, or the like having a function equivalent to that of the CCD camera may well be employed as the imaging means 4. Any other camera or the like can be substituted for the imaging means 4 as long as it has a sufficient sensitivity to the wavelength of the light emitted by the selected transmission illumination means 3.

Next, the operation of the image inspection apparatus shown in FIG. 2 will be described in detail. First, the object to-be-inspected 2 is illuminated with the transmission illumination means 3, the resulting transmission image is imaged by the imaging means 4, and the imaged image is inputted to the image memory 5.

In the configuration of FIG. 2, the input to the image memory 5 is the direct input from the imaging means 4. By way of example, however, an image data file imaged beforehand may well be read from a medium and then inputted to the image memory 5.

The image inputted to the image memory 5 is subjected to the image processing by the image processing means 6 for executing the image inspection method of this invention, and the decision result 7 is outputted. Now, the image inspection method which is executed by the image processing means 6 will be described with reference to FIGS. 1 and 3.

First, at a step S1, an image, which is obtained in such a way that illumination light emitted from the transmission illumination means 3 is transmitted through the object to-be-inspected 2, is imaged by the imaging means 4, and it is stored in a first image memory not shown. FIG. 3 shows image examples by exemplifying a case where the object to-be-inspected 2 is a wafer of polycrystal silicon.

In the case of the polycrystal silicon wafer, the brightness of the image obtained by the imaging means 4 changes as indicated at images S1_IMG1 to S1_IMG3, on account of fluctuations in the thickness of the wafer. Assuming that the image S1_IMG1 has a standard thickness, the whole image is dark in the case of the image S1_IMG2, and this indicates that the thickness of the object to-be-inspected 2 is large, so the illumination light is difficult of transmission. In the case of the image S1_IMG3, the whole image is bright contrariwise, and this indicates that the thickness of the object to-be-inspected 2 is small, so the illumination light is easy of transmission.

In the case of the polycrystal silicon, even in the standard image S1_IMG1, polycrystal components have different transmission factors, respectively, and hence, a random pattern in which luminances differ depending upon places is exhibited.

Besides, the two sorts of defects of a penetrating crack and a microscopic crack are photographed in the images S1_IMG1 to S1_IMG3. Elongate whitening at the right upper part of each image corresponds to the penetrating crack A. The penetrating crack A is a defect in which, since the wafer is cracked so as to extend between its front and rear surfaces, the illumination light directly enters the imaging means 4, so the corresponding part is brightly photographed by the imaging means 4.

On the other hand, a black branched defect B at the right lower part of each image is called the "microscopic crack". The microscopic crack is a defect in which, although the corresponding part is not cracked penetratingly, it is microscopically cracked in the interior of the wafer, whereby the transmission light is partially reflected from a destructive surface in the interior, so the corresponding part is darkly photographed by the imaging means 4. Besides, the left side part C and upper side part D of each of the images S1_IMG1 to S1_IMG3 whiten. This signifies that the end surfaces of the square object to-be-inspected 2 are photographed as images. Since the object to-be-inspected 2 does not exist at the whitening parts, the illumination light directly enters these whitening parts.

In a case where the fluctuations of the thickness of the object to-be-inspected 2 are small, no problem is posed in continuing steps which will be stated below. However, in a case where the fluctuations of the thickness are large, a step S11 needs to be applied after the step S1, so as to normalize the luminances of the images and to convert each of the dark image and the bright image into an image S11_IMG1 of appropriate brightness. The operation and advantage of this processing will be described in detail in Embodiment 3.

After the transmission image has been converted into the image S11_IMG1 of the appropriate brightness by the step S11, a step S12 is applied as may be needed. At the step S12, a average filter or a minimum filter is applied, thereby to reduce the noise of the whole image or to emphasize the defects, for example, the microscopic crack B. This will be described in detail in Embodiment 4.

Next, at the usual step S2, an image which is obtained by applying a quadratic differential filter to the image having undergone the step S1 (including the step S11 or/and the step S12 when it is or they are applied) is stored in a second image memory not shown. The "quadratic differential filter" can be said to apply a differential filter twice successively. Letting f(x, y) denote the luminance of the image of coordinates (x, y), a differential f'(x, y) and a quadratic differential f"(x, y) in an X-direction are respectively represented as follows:

$$f'(x, y) = f(x+1, y) - f(x, y) \quad \text{(Formula 1)}$$

$$\begin{aligned} f''(x, y) &= f'(x, y) - f'(x-1, y) \quad \text{(Formula 2)} \\ &= (f(x+1, y) - f(x, y)) - (f(x, y) - f(x-1, y)) \\ &= f(x+1, y) + f(x-1, y) - 2f(x, y) \end{aligned}$$

Although only the X-direction has been considered in the above formulas, the following formula is given when a Y-direction is simultaneously considered:

$$f''(x,y) = f(x+1,y) + f(x-1,y) + f(x,y+1) + f(x,y-1) - 4f(x,y) \quad \text{(Formula 3)}$$

Further, when an oblique direction of 45 degrees is considered in addition to the X- and Y-directions, the following is given:

$$f''(x,y) = f(x+1,y+1) + f(x+1,y) + f(x+1,y-1) + f(x,y+1) + f(x,y-1) + f(x-1,y+1) + f(x-1,y) + f(x-1,y-1) - 8f(x,y) \quad \text{(Formula 4)}$$

The application of the quadratic differential filter signifies that the new image is generated by substituting the luminance f(x, y) of the image into the quadratic differential f"(x, y) of (Formula 2), (Formula 3) or (Formula 4).

The quadratic differential filter functions to emphasize a part (edge) where the change of the luminance of the image is large. Therefore, when this filter is applied to the image S1_IMG1 (to the image S11_IMG1 in the case of applying the step S11, or to the image S12_IMG1 in the case of applying the step S12), the image S2_IMG1 being the quadratic differential filter image, in which the luminance of the background random pattern is made substantially constant and in which the microscopic crack B is simultaneously emphasized, is obtained. In the image S2_IMG1, the penetrating crack A has only its marginal part (edge part) emphasized.

At the step S3, binarization processing for converting, for example, a luminance of, at least, a predetermined threshold value Th1 into the highest luminance (white) and a luminance less than the threshold value Th1 into the lowest luminance (black) is executed for the image S2_IMG1, thereby to obtain an image S3_IMG1 being a first binarized image, which is stored in a third image memory not shown. The microscopic crack B can be precisely sensed by creating the image S3_IMG1 in this manner. On the other hand, regarding the penetrating crack A, only the marginal part thereof can be sensed. In order to precisely sense the penetrating crack A, the processing of the next step S4 is required.

At the step S4, the image S1_IMG1 (the image S11_IMG1 in the case of applying the step S11, or the image S12_IMG1 in the case of applying the step S12) stored in the first image memory not shown is subjected to other binarization processing, and a resulting image is stored in a fourth image memory not shown. By way of example, the binarization processing for converting a luminance of, at least, a predetermined threshold value Th2 into the lowest luminance (black) and a luminance less than the threshold value Th2 into the highest luminance (white) is executed, thereby to obtain the image S4_IMG1 being the second binarized image. In the image S4_IMG1, the penetrating crack A having whitened, and the regions C and D where the object to-be-inspected 2 does not exist are represented as black images.

Incidentally, although the binarization processing of the single threshold value has been described at each of the above steps S3 and S4, binarization processing which employs a plurality of threshold values may well be applied. By way of example, threshold values Th11 and Th12 (Th11>Th12) may well be employed at the step S3 so as to execute the following conversions:

Luminance of an image≧Th11→Lowest luminance or black
Th11>Luminance of an image>Th12→Highest luminance or white
Luminance of an image≦Th12→Lowest luminance or black The reason therefor is that, in the quadratic differential image, also a part which is extraordinarily bright may be considered to represent a defect.

Likewise, at the step S4, the binarization processing may well be executed by employing two threshold values. The threshold value Th2 at the above step S4 has been for sensing the penetrating crack A, and this is set as "Th21". When a threshold value for sensing an abnormally dark microscopic crack B is set by employing "Th22" (Th21>Th22) anew, the processing of the binarizing conversions may be executed as follows:

Luminance of an image≧Th21→Lowest luminance or black
Th21>Luminance of an image>Th22→Highest luminance or white
Luminance of an image≦Th22→Lowest luminance or black The binarized images S3_IMG1 and S4_IMG1 thus obtained are subjected to an inspection region computation and the masking of any region unnecessary for the inspection (inspection exclusion processing), for example, the exclusion of the left side part C and upper side part D, at the step S7 as may be needed. This will be described in detail in Embodiment 5.

At the step S5, the measurement of binary feature quantities is performed for the binarized images S3_IMG1 and S4_IMG1. By way of example, the area of the penetrating crack A or microscopic crack B, the vertical and lateral lengths, centroidal position (X, Y) and inertial moment of the circumscribed tetragon of the crack, the sense of the principal axis of the circumscribed tetragon, and the vertical and lateral lengths and perimetric length of the circumscribed tetragon of the crack along the principal axis are computed as feature quantities generally known. The size of the defect can be judged by computing the area, and the length and shape (elongate or circular) of the defect are known from the vertical and lateral lengths of the circumscribed tetragon along the principal axis.

Density feature quantities may well be computed from the original density image S1_IMG1 or the like by using the binary feature quantities. By way of example, the position of the defect is known from the centroidal position being the binary feature quantity, and the size thereof is known from the vertical and lateral lengths of the circumscribed tetragon, so that the mean luminance, etc. of the corresponding region can be easily computed. In a case where the density feature quantities have a better correlation to the defect to-be-detected, they may well be utilized.

Besides, in the example of FIGS. 1 and 3, the image in which the images S3_IMG1 and S4_IMG1 are superposed (or are subjected to "AND") is employed at the steps S7 and S5, but the binary feature quantity measurements of the images may well be separately executed. When the binary feature quantity measurement is performed after compositing the two images, in this manner, there is the advantage that one time of measurement suffices. At the step S6, the feature quantities obtained at the step S5 and a predetermined threshold value are compared, thereby to decide the quality of the object to-be-inspected 2.

In the above description, the microscopic crack B and the penetrating crack A have been exemplified. However, microscopic flaws, etc. correspond to the microscopic cracks, and foreign matter, etc. are photographed as black defects of comparatively large areas, so that the inspection method is applicable even to these defects without any problem.

Owing to the arrangement of the respective steps as stated above, the microscopic flaws, the foreign matter, the cracks and the like defects of the object to-be-inspected 2 can be inspected stably and precisely.

Embodiment 2

Next, Embodiment 2 of this invention will be described. In Embodiment 1, a general filter has been employed as the quadratic differential filter at the step S2, the quadratic differential has been computed by the difference of the luminances of the image, and the X- or Y-distance of the difference has been one picture element. In Embodiment 2, however, the difference distance is not limited to one picture element, but it is expanded to any desired value. In the case, for example, where the oblique direction of 45 degrees is considered in addition to the X- and Y-directions, the following is given:

$$f''(x,y)=[f(x+h,y+h)+f(x+h,y)+f(x+h,y-h)+f(x,y+h)+f(x,y-h)+f(x-h,y+h)+f(x-h,y)+f(x-h,y-h)-8f(x,y)]/(h \times h)$$ (Formula 5)

Here, "h" denotes the difference distance, and it takes integral values such as h=1, 2 and 3.

Figure 4:
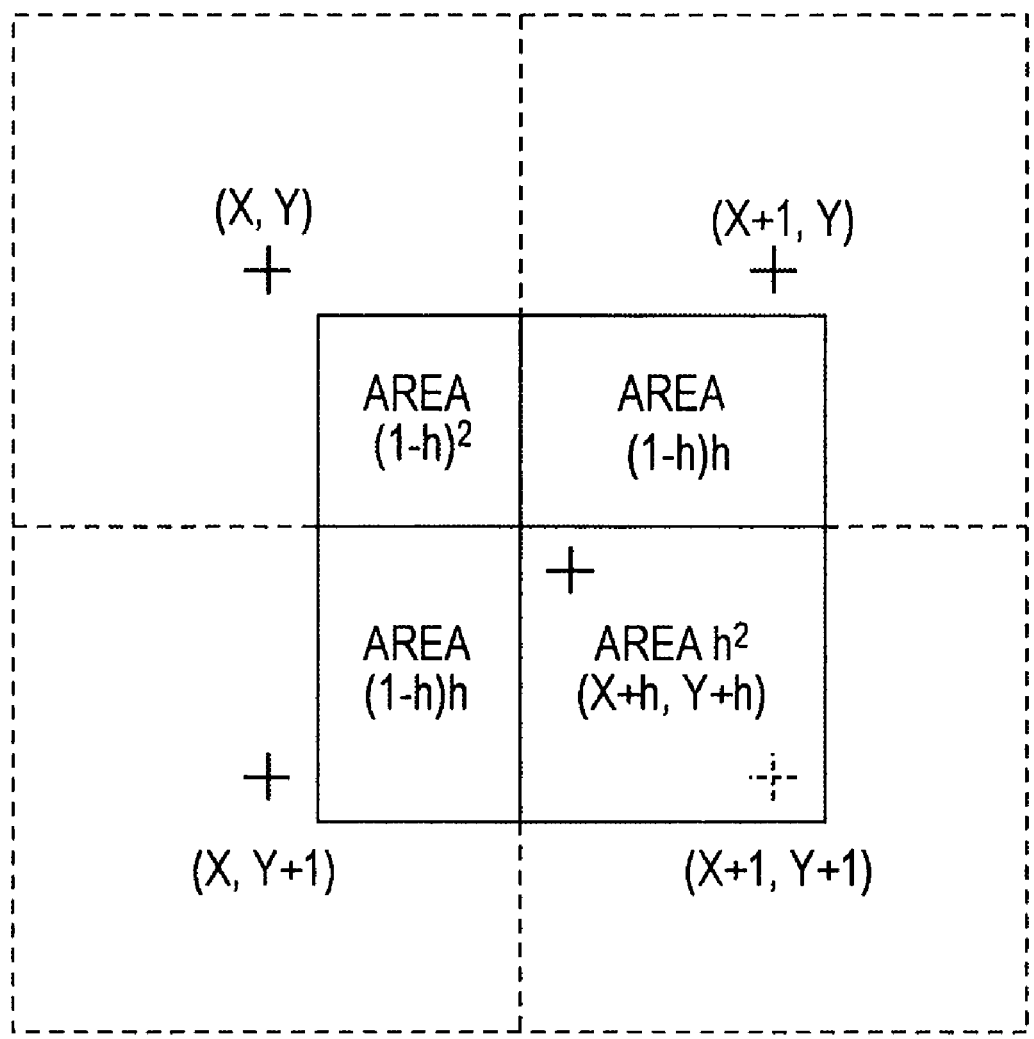
FIG. 4 is an explanatory diagram for explaining a luminance interpolation method according to Embodiment 2 of this invention.

In this invention, generalization is further promoted, and the difference distance h is expanded as a real number as follows: That is, the difference distance h is set at $0<h \leq 1$. Since the difference distance h becomes a decimal fraction, the luminance f(x+h, y+h) of an image is computed by interpolating the luminances of images. As shown in FIG. 4, the picture element of coordinates (x+h, y+h) allocates areas $h^2$, h(1−h), h(1−h) and $(1−h)^2$ to four adjacent picture elements as indicated by broken lines (each of regular squares indicated by broken lines represents one picture element). Using this fact, the luminance f(x+h, y+h) of the coordinates (x+h, y+h) is defined by the following formula:

$$f(x+h,y+h)=f(x,y) \times h^2+f(x+1,y) \times h(1-h)+f(x,y+1) \times h(1-h)+f(x+1,y+1) \times (1-h)^2$$ (Formula 6)

When a similar idea is applied, the luminances of images in (Formula 5) can be respectively computed, and hence, the quadratic differential can be computed. In the above example, $0<h \leq 1$ has been set in order to facilitate the description, but it is needless to say that the difference distance h can be computed by expanding it to a real number greater than one, by applying a similar idea.

It is understood that, when the quadratic differential is computed by altering the difference distance in this way, the degree of the edge emphasis of an image changes, so a resulting quadratic differential image changes. The detection levels of the defects of the object to-be-inspected can be adjusted by altering the difference distance and computing the quadratic differential in this manner. Besides, an inspection of higher precision can be realized by evaluating a difference distance suited to the defect emphasis of the object to-be-inspected.

Embodiment 3

Next, Embodiment 3 of this invention will be described. In Embodiment 1, it has been stated that, in the case where the fluctuations of the thicknesses of the objects to-be-inspected 2 are large, the luminances of the images need to be normalized at the step S11, so as to convert the dark image or the bright image into the image S11_IMG1 of appropriate brightness. However, when the changes of the luminances of the images are excessively large, depending upon the thicknesses of the objects to-be-inspected 2, as in the images S1_IMG1 to S1_IMG3, stable inspection results cannot be expected even by executing the detection processing at the subsequent steps.

Embodiment 3 indicates a coping method in such a case, and it consists in that the luminances of the images are normalized by adding the step S11, thereby to convert the excessively bright image or the excessively dark image into the image of appropriate brightness. A practicable procedure is as stated below.

Assuming that the image of appropriate brightness is the image S1_IMG1, a mean luminance A1 concerning the whole image S1_IMG1 is measured and recorded beforehand, and a conversion offset value E is defined as a new parameter.

Assuming the mean luminance of the image S1_IMG2 to be "A2", a conversion formula for the normalization is stipulated as follows, in case of normalizing the luminance of the image S1_IMG2:

$$Y=K \cdot X+E$$ (Formula 7)

Here, "Y" denotes the luminance after the normalization, "X" the luminance before the normalization, "E" the conversion offset value set beforehand, and "K" a conversion gain.

If the value E is given as the parameter beforehand, the gain K is easily evaluated in the following way:

$$A1=K \cdot A2+E \rightarrow K=(A1-E)/A2$$ (Formula 8)

The former formula is a restriction imposed in order that the mean luminance A2 may be converted into the mean luminance A1.

When the conversion gain K thus obtained and the parameter E set beforehand are employed, the luminance of the image S1_IMG2 can be converted in conformity with (Formula 7). It can be easily demonstrated that the mean luminance of an image into which the image S11_IMG2 has been converted in this way becomes "A1" (=mean luminance of the image S1_IMG1).

As understood from the fact that K=A1/A2 holds especially in case of setting E=0, the above method is equivalent to executing the normalization by only the magnification manipulation of the mean luminance. Besides, as understood from the fact that K=1 holds in case of setting E=A1−A2, the above method is equivalent to executing the normalization by the uniform shift of the luminances. How to determine the conversion offset value E may well be optionally selected in accordance with the situation of the object to-be-inspected 2.

Owing to such a setup of the step S11, even in the case where the thicknesses of the objects to-be-inspected 2 have fluctuated, the luminances of the images are normalized, whereby the subsequent steps can be executed with the luminances of the images held constant, and hence, detection levels can be held constant.

Embodiment 4

Next, Embodiment 4 of this invention will be described. It has been stated in Embodiment 1 that the step S12 is applied if necessary, and this step S12 constitutes Embodiment 4. At the step S12, the average filter or the minimum filter is applied, thereby to reduce the noise of the whole image or to emphasize the defects, for example, the microscopic crack B.

The "average filter" is such that the mean value of the luminance of a pertinent picture element noticed and the luminances of 4 or 8 picture elements adjoining the pertinent picture element is computed, whereupon the mean value is substituted for the luminance of the pertinent picture element. When this filter is applied, bursting luminance noise can be reduced by the effect of the averaging processing. Since the quadratic differential filter at the step S2 essentially tends to enlarge noise components, it contributes to the stability of the inspection that the obvious noise components are reduced by the average filter as may be needed.

The "minimum filter" is such that the luminance of the pertinent picture element and the luminances of the picture elements adjoining the pertinent picture element are compared, whereupon the luminance of the pertinent picture element is substituted by the minimum luminance among the luminances. When this filter is applied, the part of a dark picture element widens more, with the result that the microscopic crack B seeming dark is subjected to enlargement and emphasis processing. Besides, as understood from the operation of the minimum filter, a bright noise component can be suppressed. For these reasons, the minimum filter contributes to stably detecting the microscopic crack B.

In this manner, the average filter and the minimum filter are employed at the step S12, whereby the noise of the image can be removed, and the defects can be emphasized, so that the inspection can be stably performed.

Embodiment 5

Next, Embodiment 5 of this invention will be described. It has been stated in Embodiment 1 that the inspection region computation and the masking of any region unnecessary for the inspection (inspection exclusion processing) are executed at the step S7 as may be needed, and Embodiment 5 incarnates the functions.

In each of the images S1_IMG1 to S1_IMG3 in FIG. 3, the object to-be-inspected 2 is not photographed at either of the left side part C and upper side part D of the image, and these parts are parts which are to be excluded. Since such regions to be excluded are often found on the image obtained at the first step S1, the image obtained at the step S1 is subjected to image processing at the step S7 so as to compute the inspection exclusion regions and the inspection region.

When the images S1_IMG1 to S1_IMG3 are taken as examples, the parts C and D which rectilinearly whiten at the marginal parts of each image can be judged as lacking in the object to-be-inspected 2. Therefore, the edge detection processing of the whitening parts are added as to the marginal parts of each image, thereby to evaluate the coordinate positions of the point groups of an edge. When the point groups of the edge have been obtained, the positions thereof are subjected to rectilinear regressions, whereby the end surfaces of the object to-be-inspected 2 can be detected.

When the end surfaces of the object to-be-inspected 2 have been obtained, it is easy to decide regions outside the end surfaces, as the inspection exclusion regions, and a region inside the end surfaces, as the inspection region. It is also easy to automate these processing steps.

Although the method of computing the inspection exclusion regions from the image obtained at the step S1 has been mentioned in the above example, it is a matter of course that the inspection region/inspection exclusion regions may well be computed using the intermediate image generated at any of the subsequent steps.

When, in this manner, the inspection region and the inspection exclusion regions are automatically computed at the step S7, only the part which is really required can be inspected.

Moreover, there is the advantage that the inspection can be performed at high speed by decreasing the size of the inspection region.

Various modifications and alterations of this invention will be apparent to those skilled in the art without departing from the scope and sprit of this invention, and it should be understood that this is not limited to the illustrative embodiments set forth herein.

What is claimed is:

1. An image inspection method wherein an object to-be-inspected is illuminated by transmission illumination means, and illumination light transmitted through the object to-be-inspected is imaged as a transmission image by imaging means, so as to inspect the object to-be-inspected, comprising:
    a first step of imaging the transmission image;
    a second step of applying a quadratic differential filter to the transmission image, thereby to convert the transmission image into a quadratic differential filter image;
    a third step of binarizing the quadratic differential filter image with a predetermined threshold value, thereby to convert the quadratic differential filter image into a first binarized image;
    a fourth step of binarizing the transmission image with another predetermined threshold value, thereby to convert the transmission image into a second binarized image;
    a fifth step of performing a binary feature quantity measurement for the first binarized image and the second binarized image, thereby to calculate binary feature quantities; and
    a sixth step of deciding a quality of the object to-be-inspected from the binary feature quantities.

2. An image inspection method as defined in claim 1, wherein at the second step, quadratic differential values are computed by making a difference distance variable.

3. An image inspection method as defined in claim 1, wherein a luminance conversion step of normalizing a luminance by using a mean luminance of the transmission image is added after the first step.

4. An image inspection method as defined in claim 1, wherein a step of converting a luminance of the transmission image by employing a minimum filter or/and an average filter is added after the first step.

5. An image inspection method as defined in claim 1, wherein an inspection region of the object to-be-inspected is computed using the transmission image, before the fifth step, and the binary feature quantity measurement is not performed in any region other than the inspection region, at the fifth step.

6. An image inspection apparatus wherein an object to-be-inspected is illuminated by transmission illumination means, and illumination light transmitted through the object to-be-inspected is imaged as a transmission image by imaging means, so as to inspect the object to-be-inspected, comprising:
    an image memory in which the transmission image is stored;
    image processing means for applying a quadratic differential filter to the transmission image, thereby to convert the transmission image into a quadratic differential filter image, for binarizing the quadratic differential filter image with a predetermined threshold value, thereby to convert the quadratic differential filter image into a first binarized image, for binarizing the transmission image with another predetermined threshold value, thereby to convert the transmission image into a second binarized image, and for performing a binary feature quantity measurement for the first binarized image and the second binarized image, thereby to calculate binary feature quantities; and decision means for deciding a quality of the object to-be-inspected from the binary feature quantities.

* * * * *